United States Patent
Ochi

(10) Patent No.: US 8,235,693 B2
(45) Date of Patent: Aug. 7, 2012

(54) POWER SUPPLY DEVICE FOR ELECTRICALLY DRIVEN INJECTION MOLDING MACHINE AND ELECTRICALLY DRIVEN INJECTION MOLDING MACHINE

(75) Inventor: Kiyoshi Ochi, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 724 days.

(21) Appl. No.: 12/367,843

(22) Filed: Feb. 9, 2009

(65) Prior Publication Data

US 2009/0246307 A1 Oct. 1, 2009

(30) Foreign Application Priority Data

Mar. 28, 2008 (JP) .................... 2008-087938

(51) Int. Cl.
*B29C 45/17* (2006.01)
(52) U.S. Cl. .................... 425/162; 318/376; 318/801
(58) Field of Classification Search .................. 425/145, 425/162, 542, 556, 589; 318/376, 801
See application file for complete search history.

(56) References Cited

U.S. PATENT DOCUMENTS

| | | | | |
|---|---|---|---|---|
| 4,887,012 A | * | 12/1989 | Kiya et al. | ........... 318/434 |
| 5,362,222 A | * | 11/1994 | Faig et al. | ........... 425/145 |
| 6,142,760 A | * | 11/2000 | Niizeki et al. | ........... 425/145 |
| 6,333,611 B1 | | 12/2001 | Shibuya et al. | |
| 6,435,312 B2 | * | 8/2002 | Tajima et al. | ........... 318/801 |
| 6,682,332 B2 | * | 1/2004 | Pfahl | ........... 425/145 |
| 6,752,614 B2 | * | 6/2004 | Mizuno | ........... 425/145 |
| 7,227,323 B2 | * | 6/2007 | Yamada et al. | ........... 318/376 |
| 2001/0017242 A1 | | 8/2001 | Tajima et al. | |

FOREIGN PATENT DOCUMENTS

| | | |
|---|---|---|
| EP | 1484832 A2 | 12/2004 |
| JP | 10-174477 A | 6/1998 |
| JP | 2002-166456 A | 6/2002 |
| JP | 2007-068869 A | 3/2007 |
| JP | 2007-168177 A | 7/2007 |

OTHER PUBLICATIONS

Japanese Office Action issued Apr. 20, 2010 in corresponding Japanese application No. 2008-087938, 7 pages.
Japan Institute of Invention and Innovation, Journal of Technical Disclosure No. 97-6523, Aug. 1, 1997.
European Search Report issued on Sep. 27, 2010 in the corresponding European Patent Application No. 09001413.5.

\* cited by examiner

*Primary Examiner* — James Mackey
(74) *Attorney, Agent, or Firm* — Sughrue Mion, PLLC

(57) ABSTRACT

A power supply device for supplying an electric power to a servo amplifier is configured by an AC/DC converter and a power accumulating device. Among a molding cycle, during a process where an amount of consumed power is small, a DC voltage is supplied to the servo amplifier from the AC/DC converter and a power is accumulated in the power accumulating device. In a process such as an injection process where a large power is required, a high DC voltage is supplied to the servo amplifier from the power accumulating device in place of the AC/DC converter.

10 Claims, 8 Drawing Sheets

INJECTION POWER P$_I$

PLASTICIZING POWER P$_R$

MOLD OPENING/ CLOSING POWER P$_M$

EJECTING POWER P$_E$

INPUT/OUTPUT POWER P$_{BNK}$ OF POWER ACCUMULATING DEVICE

INPUT POWER P$_{IN}$ SUPPLIED FROM OUTSIDE

INPUT/OUTPUT POWER P$_{BNK}$ OF POWER ACCUMULATING CIRCUIT

COIL CURRENT I$_{FB}$ IN CURRENT CONTINUOUS MODE

ACCUMULATED VOLTAGE V$_{FB2}$

COIL CURRENT I$_{FB}$ IN CURRENT DISCONTINUOUS MODE

US 8,235,693 B2

POWER SUPPLY DEVICE FOR ELECTRICALLY DRIVEN INJECTION MOLDING MACHINE AND ELECTRICALLY DRIVEN INJECTION MOLDING MACHINE

This application claims priority from Japanese Patent Application No. 2008-087938, filed on Mar. 28, 2008, the entire subject matter of which is incorporated herein by reference.

BACKGROUND OF THE INVENTION

1. Field of the Invention

The present invention relates to an electrically driven injection molding machine and a power supply device for an electrically driven injection molding machine for supplying electric power to servo motors for driving the constituent parts of the electrically driven injection molding machine such as a screw, a mold opening/closing device, a molded product ejecting device.

2. Description of the Related Art

As is well known conventionally, an injection molding machine is configured by a pair of metal molds, a mold clamping device for mold-clamping these metal molds, an injection device for melting resin and injecting the resin within the metal molds etc. The injection device is configured by an injection cylinder and a screw and a plunger which are driven in the rotational direction and an axial direction within the injection cylinder etc. In the electrically driven injection molding machine, such the mold clamping device, the screw etc. are respectively driven by servo motors provided independently. In general, the injection molding process includes a measuring process for melting resin and accumulating the melted resin at the tip end portion within the cylinder, a mold clamping process for mold-clamping the metal molds, an injection process for injecting the melted resin within the metal molds thus mold-clamped, a pressure holding process for holding the pressure of the melted resin after the injection, a mold opening process for opening the metal molds, and a protruding process for protruding an ejector pin to take out a molded product from the metal molds etc. Among these processes, although the injection process requires a shorter time for the processing as compared with other processes, the injection process requires a large output power. Thus, a large servo motor of a high output is employed as the servo motor for driving the screw in the axial direction in the injection process. In recent years, needs of a so-called super-high speed injection molding has been increased which is excellent in the transfer property and can form a molded product of a complicated and fine shape and also a molded product of a thin thickness with good or excellent transfer property. An injection molding machine capable of executing such the super-high speed injection molding requires a further high output power in the injection process and so requires the servo motor of a larger scale.

As is well known conventionally, the servo motor is driven by a three-phase AC voltage generated by a servo amplifier formed by an inverter circuit. The inverter circuit is supplied with a DC voltage. The DC voltage can be obtained by rectifying the three-phase AC voltage supplied from the power receiving equipment of a factory by using a conventionally well-known converter. In the case of driving the servo motor with a high output power, a DC current supplied to the servo amplifier is required to be large. Thus, in view of the injection process in which the servo motor is required to be driven with a high output power, a three-phase AC power supply for supplying the three-phase AC voltage also requires a large current supply ability and so the power receiving equipment of a factory is required to have a relatively large power capacity. Further, since the fee structure of electric power differs depending on the maximum power to be contracted, the electricity bill becomes high when the power receiving equipment of a large power capacity is installed. In view of the requirement of the energy saving and cost reduction, a technique is demanded which can reduce the power capacity required for the power receiving equipment to thereby reduce the required electricity bill.

Japan Institute of Invention and Innovation, Journal of Technical Disclosure No. 97-6523 describes a PWM converter which is an AC/DC converter applied to the injection molding machine and including a loop for controlling the voltage of the converter and a control loop for maintaining the sine wave of the current, whereby the voltage is stabilized and the voltage can be converted into a DC current of high quality. In the AC/DC converter according to an example of the related art, since the three-phase AC current supplied from the three-phase AC power supply is controlled so as to be shaped in a sine wave, a harmonic wave causing the reduction of a power factor can be suppressed and a DC current can be obtained based on the stable voltage, advantageously. Further, since the power factor is kept to a value near 1, an amount of a reactive power is small and so the power is not consumed wastefully. Further, since a kinetic energy accumulated in the driving portion of the injection molding machine is regenerated as electric energy and returned to the power supply side as electric power, the energy efficiency is high.

However, there seem to be some points to be improved. That is, in the AC/DC converter according to the example of the related art, although the power factor can be kept to a value near 1 and an amount of a reactive power can be reduced, the maximum power required to be high in the injection process is not reduced and the electric power required in the respective processes is not smoothed. In general, the power capacity of the power receiving equipment is determined by the time average of the power consumed by production machines and working machines etc. installed in a factory, that is, an average power. When the power capacity is determined in this manner, since a large power is consumed at the time of the injection process, a phenomenon that the voltage within the factory reduces, that is, a so-called voltage drop may arise and a breaker maybe tripped. In particular, in the case where a plurality of the injection molding machines are installed in a factory, if the injection process is started by these injection molding machines simultaneously, the frequency of the occurrence of the voltage drop etc. is enhanced. Thus, it is necessary to determine the power capacity of a sufficient value in such a manner that an almost half of the maximum power necessary for the injection process is secured, and so the installation cost for the power receiving equipment becomes high.

SUMMARY OF THE INVENTION

An object of the invention is to provide a power supply device for an electrically driven injection molding machine which can obviate the aforesaid problem of the related art and the electrically driven injection molding machine having such the power supply device. To be concrete, an object of the invention is to provide the power supply device for the electrically driven injection molding machine and the electrically driven injection molding machine which can reduce the maximum power supplied from the outside in a process such as an injection process requiring a high output, can smooth a required power in respective processes, can reduce a power capacity required in the power receiving equipment of a factory, can reduce a cost of equipments and further can reduce a required electricity bill.

According to the invention, a power supply device for supplying a DC voltage to a servo amplifier of an injection molding machine is configured by an AC/DC converter and a power accumulating device. The power accumulating device is connected to a DC circuit side of the AC/DC converter and is configured to accumulate the power. When accepting a predetermined output request, the power accumulating device supply to the servo amplifier a DC voltage higher than the DC voltage generated from the AC/DC converter. Further, the invention provides an injection molding machine including the power supply device.

According to a first aspect of the invention, there is provided a power supply device for an electrically driven injection molding machine which supplies electric power to a servo motor for driving a member of an electrically driven injection molding machine, the power supply device comprising: an AC/DC converter; and a power accumulating device, wherein: the AC/DC converter is configured to convert an AC voltage into a DC voltage and supply the DC voltage to a servo amplifier for driving the servo motor; and the power accumulating device is coupled to a DC circuit of the AC/DC converter, and is configured to accumulate electric power supplied from the DC circuit in a capacitor, and when accepting a predetermined output request, to supply a DC voltage to the DC circuit to thereby supply to the servo amplifier a DC voltage higher than the DC voltage generated from the AC/DC converter.

According to a second aspect of the invention, in the power supply device for an electrically driven injection molding machine: the power accumulating device comprises a power accumulating circuit and a control circuit; the power accumulating circuit comprises a first loop circuit and a second loop circuit; the first loop circuit comprises a positive terminal, a negative terminal, a coil, a first switch circuit and a capacitor coupled in series; the second loop circuit comprises the positive terminal, the negative terminal, the coil and a second switch circuit coupled in series; the first switch circuit comprises a first diode and a first transistor coupled in parallel, the first diode being coupled so as to flow a current in a direction from the positive terminal toward the negative terminal, and the first transistor being coupled so as to flow a current in an opposite direction when being driven by a control signal from the control circuit; and the second switch circuit comprises a second diode and a second transistor coupled in parallel, the second diode being coupled so as to flow a current in a direction from the negative terminal toward the positive terminal, and the second transistor being coupled so as to flow a current in an opposite direction when being driven by the control signal from the control circuit.

According to a third aspect of the invention, the power supply device further comprises: a current detection circuit for detecting a current flowing into the coil, wherein the control circuit controls an opening/closing operation of the first switch circuit and the second switch circuit so that the current flowing into the coil of the power accumulating circuit is within a predetermined limit value.

According to a fourth aspect of the invention, the power supply device further comprises: a voltage detection circuit for detecting a DC voltage of the AC/DC converter, wherein the control circuit controls an opening/closing operation of the first switch circuit and the second switch circuit so that the DC voltage of the AC/DC converter becomes a predetermined voltage.

According to a fifth aspect of the invention, the power supply device further comprises: a voltage detection circuit for detecting a voltage of the capacitor of the power accumulating device, wherein the control circuit controls an opening/closing operation of the first switch circuit and the second switch circuit so that the voltage of the capacitor becomes a predetermined voltage at a time of accumulating power into the power accumulating device.

According to a sixth aspect of the invention, there is provided an electrically driven injection molding machine comprising the power supply device according to the first aspect.

According to a seventh aspect of the invention, the electrically driven injection molding machine further comprises: a screw; a mold opening/closing device; a molded product ejecting device; and a plurality of servo motors configured to drive the screw, the mold opening/closing device, and the molded product ejecting device.

According to the invention thus configured, the power supply device for the injection molding machine includes the AC/DC converter and the power accumulating device and is configured in a manner that the power accumulating device is coupled to the DC circuit of the AC/DC converter, and is configured to accumulate electric power supplied from the DC circuit, and when accepting the predetermined output request, to supply a DC current to the DC circuit of the AC/DC converter to thereby supply to the servo amplifier a DC voltage higher than the DC voltage generated from the AC/DC converter. Thus, when the AC/DC converter is configured by a diode rectifying circuit well known in the related art, the DC voltage becomes larger than the peak value of the AC voltage and the DC current is not supplied from the AC/DC converter. That is, a power is not supplied from the AC side of the AC/DC converter. When the AC/DC converter is configured by a rectifying circuit such as a PWM converter well known in the related art, that is, in the case of having a function of boosting the voltage of the DC circuit by using the switching operation of the transistor to thereby increase the voltage of the DC circuit higher than the peak value of the AC voltage, the switching operation of the transistor of the AC/DC converter is stopped at the time of supplying the DC current from the accumulating circuit, whereby a power is not supplied from the AC side of the AC/DC converter like the diode rectifying circuit. Thus, in the process requiring a large power such as an injection process, a DC power of a high voltage can be supplied from the power accumulating device in place of the AC/DC converter. Thus, a power capacity required for the AC/DC converter can be made small and the maximum power supplied to the injection molding machine from the outside can also be reduced. Further, since a power can be accumulated in the power accumulating device during another process requiring a relatively small amount of power, a power can be smoothed in the entirety of the molding process and so the power capacity required for the power receiving equipment of a factory can be made small. Furthermore, since the maximum power can be reduced, the electricity bill can be saved.

According to the second aspect of the invention, the power accumulating circuit constituting the power accumulating device is configured by a capacitor, a coil, diodes and transistors etc., wherein electric charges accumulated in the capacitor can be taken out or charged as a current flowing into the coil by utilizing the switching operation of the diodes and the transistors. Thus, the charging/discharging property of the capacitor can be determined by controlling the current of the coil. That is, since it is possible to utilize an accumulated power which is not influenced by the internal resistor of the power accumulating capacitor, unique effects of the invention can be attained that a cheap capacitor can be used.

According to the third aspect of the invention, since the current flowing into the coil constituting the power accumulating circuit is limited, such phenomena can be prevented from occurring that an excessive current flows into the coil to break it or that the power accumulating capacitor and the capacitor of the AC/DC converter become failure or are damaged by an excessive charging/discharging current.

Further, according to the fourth aspect of the invention, since the DC voltage supplied to the servo amplifier from the power accumulating device is controlled so as to be a predetermined voltage, the DC voltage supplied to the servo amplifier can be stabilized.

Furthermore, according to the fifth aspect of the invention, since the power accumulated in the power accumulating device is controlled so as to be a suitable voltage, an abnormal voltage is prevented from being applied to the power accumulating circuit.

BRIEF DESCRIPTION OF THE DRAWINGS

FIGS. 1A to 1C are diagrams for explaining the power supply device according to the embodiment and the circuit of the AC/DC converter which is a part constituting the power supply device, wherein FIG. 1A is a diagram for schematically explaining the coupling state of the servo amplifiers of the power supply device and an injection molding machine, FIG. 1B is a circuit diagram for explaining a diode rectifying circuit, and FIG. 1C is a circuit diagram for explaining a PWM converter;

FIGS. 2A and 2B are circuit diagrams for explaining the circuit of the power accumulating device according to the embodiment, wherein FIG. 2A is the circuit diagram of the power accumulating device and FIG. 2B is the circuit diagram of a power accumulating circuit;

FIG. 5E shows a graph representing a power inputted into and outputted from the power accumulating device, and FIG. 5F shows a graph representing a power supplied to the injection molding machine from the outside.

FIGS. 6A to 6D are graphs showing the changes of the power and current etc. in the case where power is inputted into and outputted from the power accumulating circuit according to the embodiment, wherein FIG. 6A shows the input/output power of the power accumulating circuit, FIG. 6B shows a coil current in the case of operating the circuit in a current continuous mode, FIG. 6C shows the accumulated voltage of the capacitor, and FIG. 6D shows the coil current in the case of operating the circuit in a current discontinuous mode;

FIGS. 7A to 7C are circuit diagrams for explaining the power accumulating circuit according to another embodiment of the invention, wherein FIGS. 7A to 7C show the circuit diagrams according to the second to fourth embodiments, respectively; and FIGS. 8A and 8B are circuit diagrams for explaining the power accumulating device according to another embodiment of the invention, wherein FIG. 8A is the circuit diagram of the circuit of the power accumulating device, and FIG. 8B is the circuit diagram of the power accumulating circuit.

DETAILED DESCRIPTION OF THE PREFERRED EMBODIMENTS

Figure 1A:
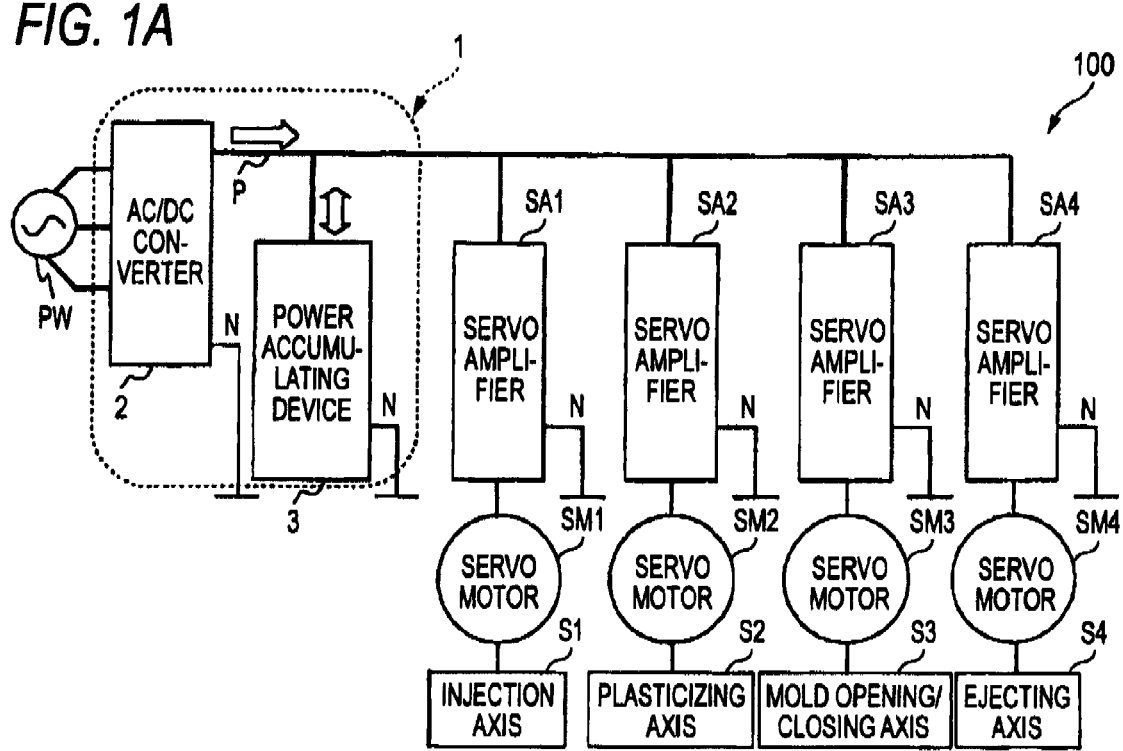

Hereinafter, an embodiment according to the invention will be explained. Like the power supply device of the well known related art, the power supply device for an electrically driven injection molding machine 100 according to the embodiment also rectifies a three-phase AC current and supplies a DC voltage to a servo amplifier. Thus, as shown in FIG. 1A, the power supply device 1 for an electrically driven injection molding machine 100 according to the embodiment is also coupled to a three-phase AC power supply PW and the positive voltage line P on a DC circuit side thereof is coupled to servo amplifiers SA1, SA2, SA3 and SA4. Since each of the power supply device 1 and the servo amplifiers SA1, SA2, SA3 and SA4 are coupled to a negative voltage line N, the power supply device 1 can supply a DC voltage to the servo amplifiers SA1, SA2, SA3 and SA4 via a positive voltage line P. Thus, the servo amplifiers SA1, SA2, SA3 and SA4 can drive servo motors SM1, SM2, SM3 and SM4 provided in correspondence to an injection axis S1 for driving a screw in an axial direction, a plasticizing axis S2 for driving the screw in the rotation direction, a mold opening/closing axis S3 and an ejecting axis S4 for driving an ejector pin, respectively. The power supply device 1 according to the embodiment is configured by an AC/DC converter 2 for converting the three-phase AC voltage into the DC voltage and a power accumulating device 3. As explained later, the power accumulating device 3 stores a power supplied from the AC/DC converter 2 and is arranged to, when receiving an output request, control the stored power into a predetermined voltage and supply the voltage to the positive voltage line P.

Figure 1B:
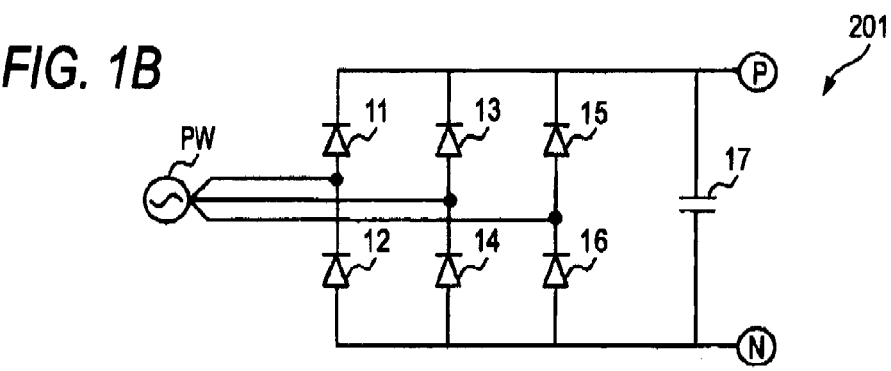
Figure 1C:
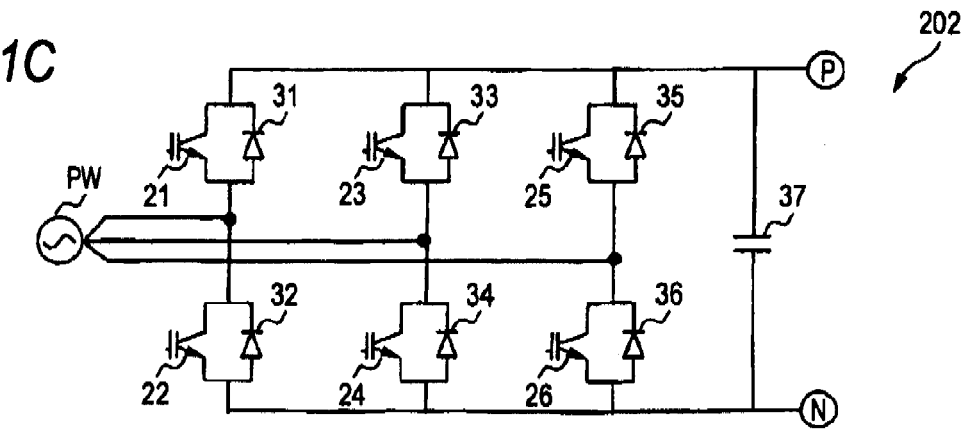

The AC/DC converter 2 is a converter for converting the three-phase AC voltage into the DC voltage and is configured by a diode rectifying circuit 201, a PWM converter 202, etc. As known in the related art, the diode rectifying circuit 201 is configured by six diodes 11 to 16 and a capacitor 17 as shown in FIG. 1B. The diode rectifying circuit 201 is arranged in a manner that the polarities of all the diodes are aligned in the same direction, then three pairs of the diodes each pair including two diodes connected in series are disposed in parallel and connected between the positive DC voltage line and the negative DC voltage line, and three lines of the respective phases of the three-phase AC power supply are connected to the connection points between the two diodes of the three pairs respectively. Thus, the three-phase AC voltage is rectified by the diodes 11 to 16 and the DC voltage is supplied to the outside from a positive terminal P and a negative terminal N. The pulsating component of the DC voltage generated by the rectifying operation is smoothed by the capacitor 17 provided between the positive terminal P and the negative terminal N. As also know in the related art, the PWM converter 202 is configured by six transistors 21 to 26, six diodes 31 to 36 and a capacitor 37 as shown in FIG. 1C. The PWM converter 202 is a modified circuit of the diode rectifying circuit 201. The PWM converter 202 is arranged in a manner that the transistors 21 to 26 are respectively coupled in parallel to the diodes 31 to 36 which correspond to the respective diodes of the diode rectifying circuit 201, whereby a current can be flown in the direction opposite to the forward direction of each of the diodes 31 to 36 when the corresponding one of the transistors 21 to 26 is turned on, respectively. The PWM converter 202 can rectify and convert the three-phase AC current into the DC current like the diode rectifying circuit 201. However, since the PWM converter 202 is configured to be substantially same as a well known inverter circuit, when the transistors 21 to 26 are controlled by a not-shown control circuit, a regenerative power collected from the DC current side can be returned to the three-phase AC power supply side like the well known technique of the related art.

Figure 2A:
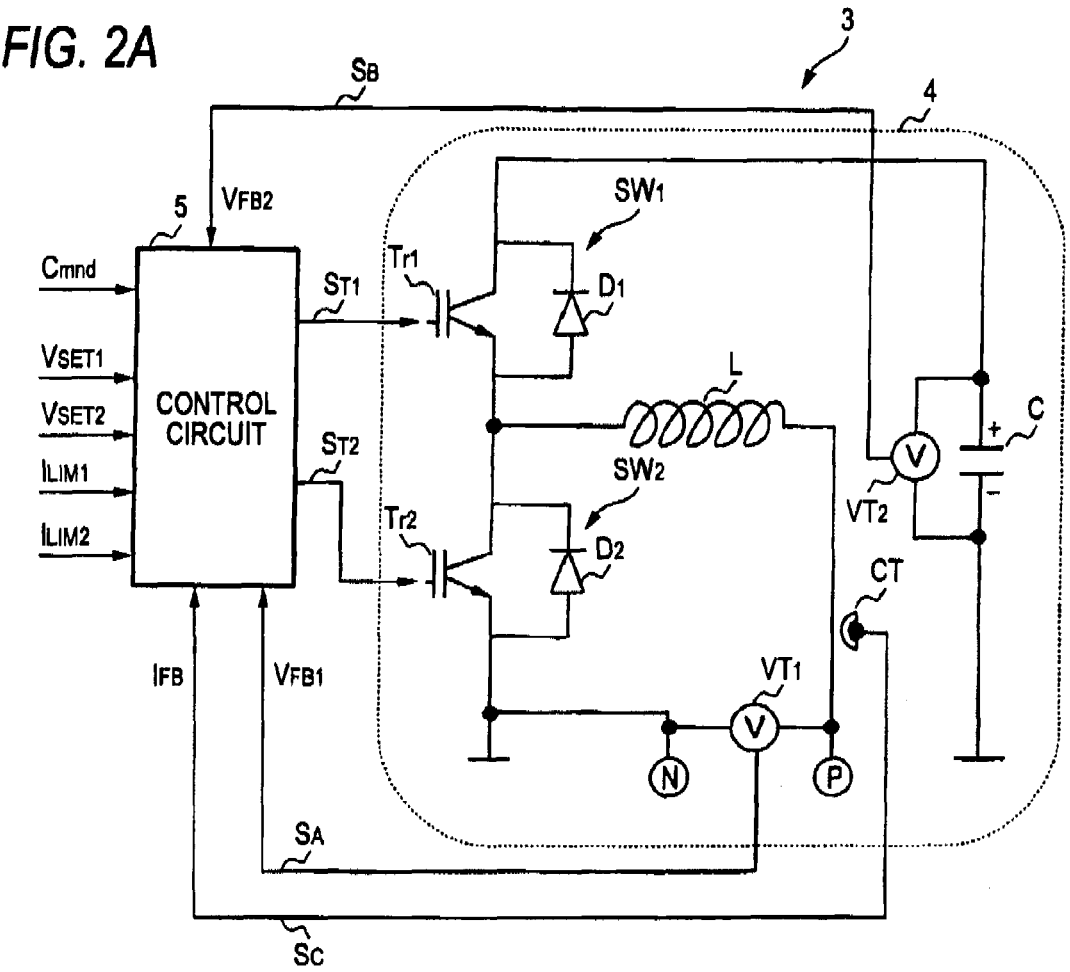

A power accumulating device 3 according to the first embodiment of the invention is configured by a power accumulating circuit 4 and a control circuit 5, as shown in FIG. 2A. The power accumulating circuit 4 stores power supplied form the AC/DC converter 2 via the positive terminal P and the negative terminal N of the DC voltage and outputs the stored power from the positive terminal P and the negative terminal N as the DC voltage. The control circuit 5 controls the power accumulating circuit 4. Actually, the power accumulating circuit 4 is coupled to the control circuit 5 via a photo coupler so as to be electrically insulated to each other in order to prevent such a phenomenon that the current on the power accumulating circuit 4 side flows into the control circuit 5 to thereby break the electronic element within the control circuit 5. However, in order to simplify the explanation, the power accumulating circuit 4 and the control circuit 5 are shown in a directly coupled manner.

Figure 2B:
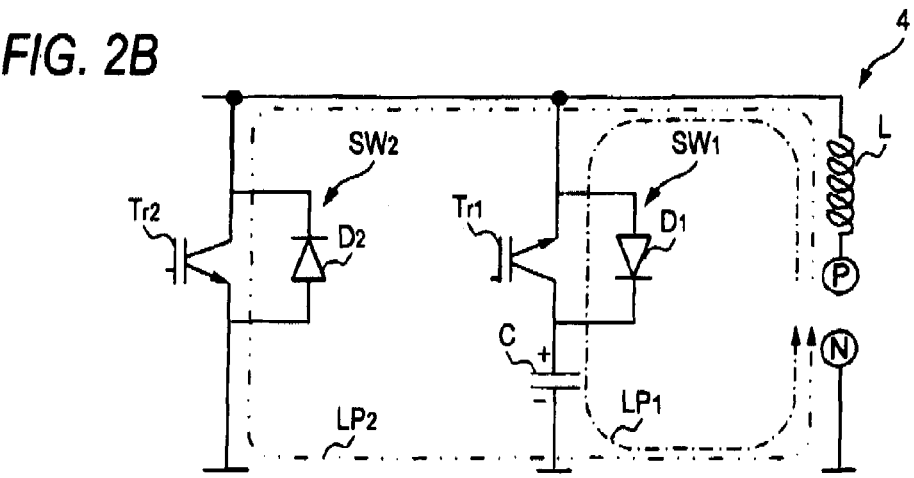

The power accumulating circuit 4 is configured by the positive terminal P and the negative terminal N, a capacitor C, a coil L, and first and second switch circuits $SW_1$, $SW_2$. The first switch circuit $SW_1$ is configured by a first transistor $Tr_1$ and a first diode $D_1$, and the second switch circuit $SW_2$ is configured by a second transistor $Tr_2$ and a second diode $D_2$. A coil current flowing through the coil L is measured by a current detector CT. An electric double layer capacitor is used as the capacitor C, for example. An insulated-gate bipolar transistor, that is, an IGBT is used as each of the transistors $Tr_1$, $Tr_2$. The power accumulating circuit 4 shown in FIG. 2A is a power storage circuit according to the first embodiment and an equivalent circuit thereof is shown in FIG. 2B. The power accumulating circuit 4 will be explained with reference to the simplified drawing of FIG. 2B. In the power accumulating circuit 4, the negative terminal N, the positive terminal P and the coil L connected to the positive terminal P are coupled by first and second loop circuits $LP_1$, $LP_2$. That is, the first loop circuit $LP_1$ is a series circuit of the negative terminal N, the positive terminal P, the coil L, the first switch circuit $SW_1$ and the capacitor C. The second loop circuit $LP_2$ is a series circuit of the negative terminal N, the positive terminal P, the coil L and the second switch circuit $SW_2$. Each of the switch circuits $SW_1$, $SW_2$ is configured by a parallel circuit of a diode and a transistor, and is a circuit for controlling the flow of a current in a manner that a current is freely flown in one direction but a current is flown in the opposite direction only when the transistor is turned on, that is, when the transistor is switched to an ON state. To be concrete, in the first switch circuit $SW_1$, the first diode $D_1$ is connected so as to flow the current from the positive terminal P to the negative terminal N, and the first transistor $Tr_1$ is coupled in parallel to the first diode $D_1$ so as to flow the current in the opposite direction when it is turned on. In the second switch circuit $SW_2$, the second diode $D_2$ is connected so as to flow the current from the negative terminal N to the positive terminal P, and the second transistor $Tr_2$ is coupled in parallel to the second diode $D_2$ so as to flow the current in the opposite direction when it is turned on.

In such the power accumulating circuit 4, a voltage between the negative and positive terminals N, P, that is, a terminal voltage $V_{FB1}$ is detected by a voltage detector $VT_1$ and applied to the control circuit 5 via a signal line $S_A$. A voltage of power accumulated in the capacitor C, that is, an accumulated voltage $V_{FB2}$ is also detected by a voltage detector $VT_2$ and applied to the control circuit 5 via a signal line $S_B$. Since the control circuit 5 is also connected to a signal line Sc from the current detector CT, a coil current $I_{FB}$ flowing through the coil L is also applied to the control circuit 5. Since the control circuit 5 is connected to the first transistor $Tr_1$ via a signal line $ST_1$ and connected to the second transistor $Tr_2$ via a signal line $ST_2$, the transistors $Tr_1$, $Tr_2$ can be turned on and off by a control signal from the control circuit 5. The processing performed by the control circuit 5 will be explained in detail later.

Figure 3A:
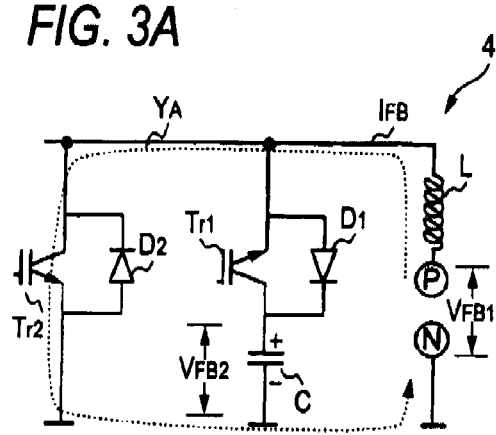
FIGS. 3A to 3D are diagrams for schematically explaining the action of the power accumulating circuit according to the embodiment, wherein each of FIGS. 3A and 3B is a diagram for explaining the operation state of the circuit in the case of accumulating power in the power accumulating circuit, and each of FIGS. 3C and 3D is a diagram for explaining the operation state of the circuit in the case of outputting power to the outside from the power accumulating circuit.
Figure 3B:
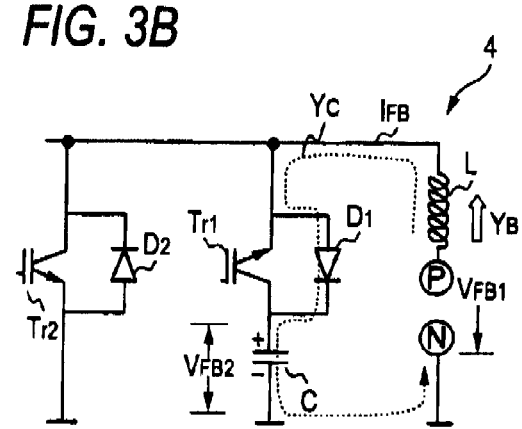

The function of the power accumulating circuit 4 will be explained with reference to FIGS. 3A to 3D. In the power accumulating circuit 4, since the first diode $D_1$ is disposed so as to flow the current freely from the positive terminal P to the capacitor C in the initial state, the voltage on the positive electrode (+) side of the capacitor C is equal to the voltage of the positive terminal P. Thus, the accumulated voltage $V_{FB2}$ is same as the terminal voltage $V_{FB1}$. The explanation will be made as to a case where electric power is accumulated from this state. As shown in FIG. 3A, the second transistor $Tr_2$ is switched, that is, turned on. Thus, a current flows as shown by an arrow $Y_A$. When a predetermined time lapses after the flow of the current, magnetic energy is accumulated in the coil L. Then, when the second transistor $Tr_2$ is tuned off, as shown in FIG. 3B, an electromotive force of a high voltage is instantaneously generated in the coil L in an arrow direction $Y_B$ due to the magnetic energy accumulated in the coil L. A current flows in the direction shown by an arrow $Y_C$ via the first diode $D_1$ by the electromotive force thus generated and electric power is accumulated in the capacitor C. That is, by the function of the coil L, the voltage is boosted and charged in the capacitor C. Hereinafter, when the second transistor $Tr_2$ is tuned on and off repeatedly, a sufficient electric power is accumulated in the capacitor C and so the accumulated voltage $V_{FB2}$ becomes higher than the terminal voltage $V_{FB1}$.

Figure 3C:
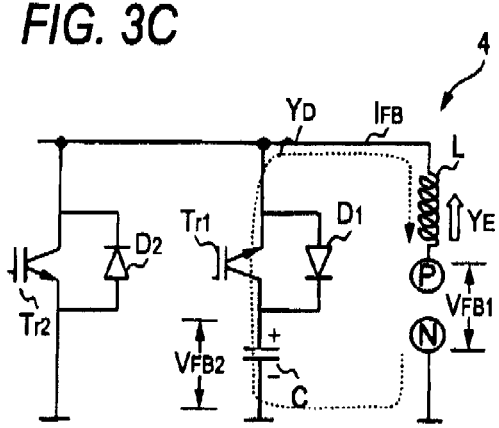
Figure 3D:
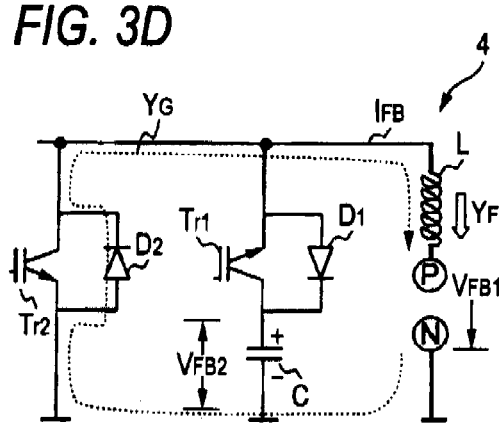

The explanation will be made as to a case of outputting a current to the outside. According to the aforesaid operation, since the accumulated voltage $V_{FB2}$ and the terminal voltage $V_{FB1}$ satisfies the relation of $V_{FB2} > V_{FB1}$, when the first transistor $Tr_1$ is turned on, a current flows in the direction of an arrow $Y_D$ as shown in FIG. 3C. When the current flows in this manner, magnetic energy is accumulated in the coil L and an electromotive force is generated in the coil L in the direction of an arrow $Y_E$. That is, the voltage difference between the accumulated voltage $V_{FB2}$ and the terminal voltage $V_{FB1}$ is assigned to the electromotive force of the coil L. Next, the first transistor $Tr_1$ is turned off. Thus, as shown in FIG. 3D, an electromotive force of a high voltage is generated in the coil L in an arrow direction $Y_F$ due to the magnetic energy accumulated in the coil L so as to maintain the current of the coil L, whereby a current flows in an arrow direction $Y_G$ via the second diode $D_2$. Thus, the terminal voltage $V_{FB1}$ is kept to be higher than the DC voltage supplied from the AC/DC converter 2 since the power accumulating circuit 4 supplies an electric power larger than the consumption power amount of a servo system connected to the positive and negative terminals P, N. Hereinafter, when the first transistor $Tr_1$ is tuned on and off repeatedly, a predetermined DC current can be outputted to the outside from the terminal voltage $V_{FB1}$. That is, the power can be supplied to the outside. The smoothing capacitor 17 or 37 is provided at the AC/DC converter 2 connected to the positive and negative terminals P, N. When the voltage between the positive and negative terminals P, N is detected and the first transistor $Tr_1$ is tuned on and off suitably, the terminal voltage $V_{FB1}$ can be maintained at a stable predetermined voltage so that the electric charges of each of the smoothing capacitors 17, 37 becomes constant.

Figure 4:
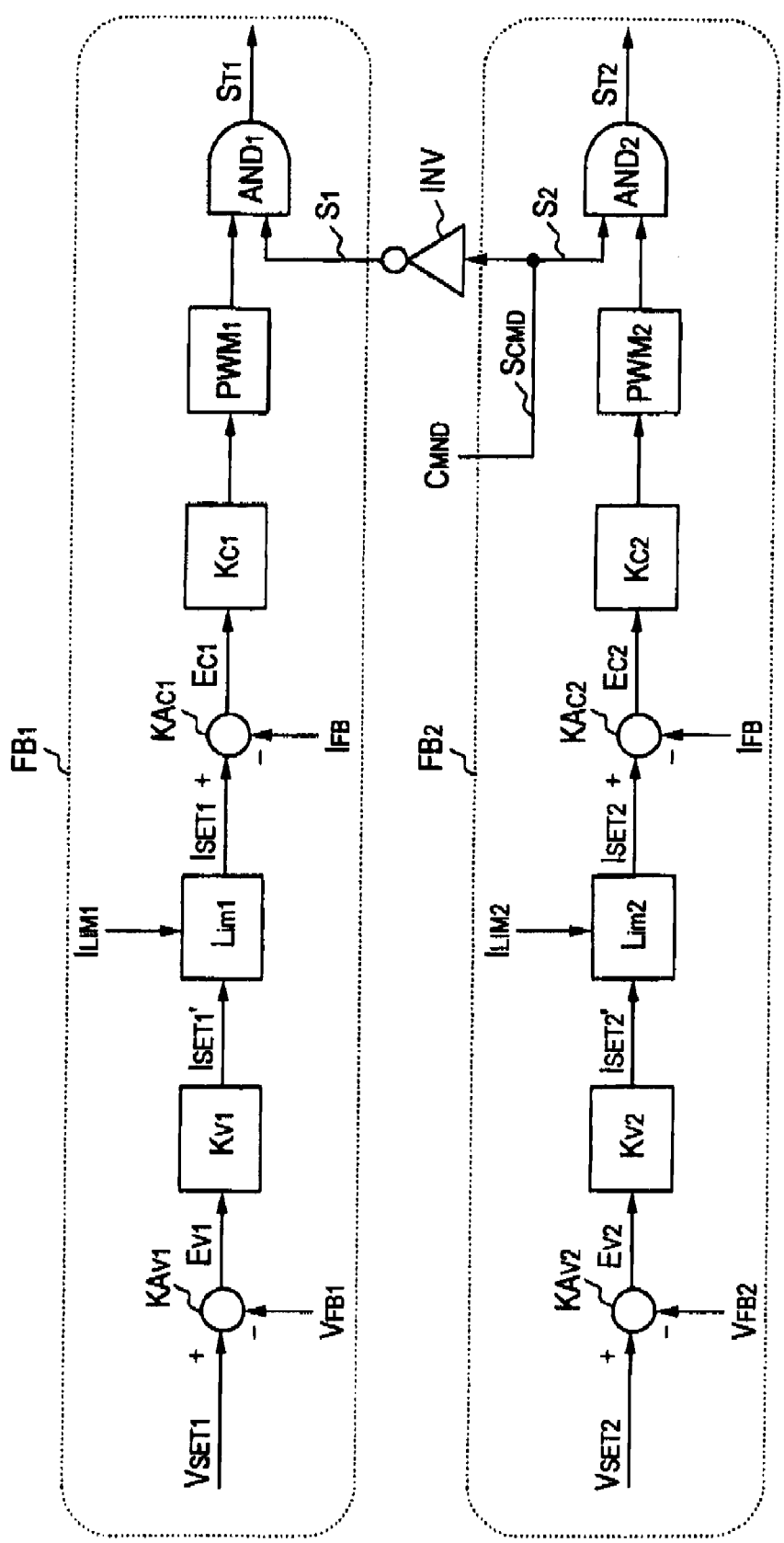
FIG. 4 is a block diagram for explaining the operation of the control circuit of the power accumulating device according to the embodiment.

The explanation will be made as to the control circuit 5. The control circuit 5 controls the power accumulating circuit 4. As shown by a block diagram in FIG. 4 in order to explain the calculation contents, the calculation function of the control circuit 5 is realized by two first and second functional blocks $FB_1$, $FB_2$. The first functional block $FB_1$ is a functional block for controlling and converting the power accumulated in the capacitor C into a predetermined voltage or a predetermined current to thereby output to the outside of the power accumulating device 3. The second functional block $FB_2$ is a functional block for accumulating the power supplied from the outside into the capacitor C.

First, the explanation will be made as to the calculation of the first functional block $FB_1$. The setting value of the terminal voltage $V_{FB1}$, that is, an output voltage setting value $V_{SET1}$ is given from the outside. The output voltage setting value $V_{SET1}$ and the measured terminal voltage $V_{FB1}$ are input to a first adding point $KA_{V1}$ to thereby calculate a voltage deviation value $E_{V1}$ therebetween. The voltage deviation value $E_{V1}$ is subjected to an operation amplification processing by a voltage controller $K_V$, whereby a provisional setting current $I_{SET1'}$ to be flown into the coil L is obtained. The provisional setting current $I_{SET1'}$ is limited by a limiter $L_{im1}$ so as not to exceed the limited value $I_{LIM1}$ of the coil current applied from the outside to thereby obtain a current setting value $I_{SET1}$. The current setting value $I_{SET1}$ and a measured coil current $I_{FB}$ are input to a second adding point $KA_{C1}$ to thereby calculate a current deviation value $E_{C1}$ therebetween. The polarity of each of the current setting value $I_{SET1}$ and the coil current $I_{FB}$ is set to be positive in the direction of the current flowing from the coil L toward the terminal P. The current deviation value $E_{C1}$ is subjected to an operation amplification processing by a current controller $K_{C1}$, and the output of the current controller is modulated in the pulse width of an ON time or OFF time thereof by a pulse width modulator $PWM_1$ in a manner that a ratio of the ON time of the first transistor $T_{r1}$ becomes larger as the output of the current controller $K_{C1}$ becomes larger. The output of the pulse width modulator is inputted to an AND element $AND_1$. The output of the pulse width modulator is logically multiplied by a signal of a signal line $S_1$ described later by the AND element $AND_1$ and the output signal of the AND element is outputted from a signal line $S_{T1}$. According to the aforesaid operations, the voltage between the terminals P and N can be set to the output voltage setting value $V_{SET1}$ by turning on and off the first transistor $T_{r1}$, and the power accumulated in the capacitor C can be outputted between the terminals P and N. Further, the coil current $I_{FB}$ in this case can also be controlled.

Next, the operation performed by the second functional block $FB_2$ will be explained. The setting value of the accumulated voltage $V_{FB2}$, that is, an accumulated voltage setting value $V_{SET2}$ is given from the outside. The accumulated voltage setting value $V_{SET2}$ and the measured accumulated voltage $V_{FB2}$ are input to a third adding point $KA_{V2}$ to thereby calculate a voltage deviation value $E_{V2}$ therebetween. The voltage deviation value $E_{V2}$ is subjected to an operation amplification processing by a voltage controller $K_{V2}$, whereby a provisional setting current $I_{SET2'}$ to be flown into the coil L is obtained. The provisional setting current $I_{SET2'}$ is limited by a limiter $L_{im2}$ so as not to exceed the limited value $I_{LIM2}$ of the coil current applied from the outside to thereby obtain a current setting value $I_{SET2}$. The current setting value $I_{SET2}$ and the measured coil current $I_{FB}$ are input to a fourth adding point $KA_{C2}$ to thereby calculate a current deviation value $E_{C2}$ therebetween. The polarity of each of the current setting value $I_{SET2}$ and the coil current $I_{FB}$ is set to be positive in the direction of the current flowing from the terminal P toward the coil L. The current deviation value $E_{C2}$ is subjected to an operation amplification processing by a current controller $K_{C2}$, and the output of the current controller is modulated in the pulse width of an ON time or OFF time thereof by a pulse width modulator $PWM_2$ in a manner that a ratio of the ON time of the second transistor $T_{r2}$ becomes larger as the output of the current controller $K_{C2}$ becomes larger. The output of the pulse width modulator is inputted to an AND element $AND_2$. The output of the pulse width modulator is logically multiplied by a signal of a signal line $S_2$ described later by the AND element $AND_2$ and the output signal of the AND element is outputted from a signal line $S_{T2}$. According to the aforesaid operations, the voltage of the accumulated voltage $V_{FB2}$ is controlled so as to coincide with the accumulated voltage setting value $V_{SET2}$ applied from the outside while controlling the coil current $I_{FB}$, whereby the capacitor C can accumulate a power of $C \cdot V_{SET2}^2/2$.

The control circuit 5 is also applied with a switching signal $C_{MND}$ from the outside via a signal line $S_{CMD}$. The signal line $S_{CMD}$ is arranged in a manner that one branch thereof is coupled to the AND element $AND_2$ via the signal line $S_2$ and the other branch thereof is coupled to the AND element $AND_1$ via an inverter element INV and further the signal line $S_1$. The switching signal $C_{MND}$ is formed by a binary value representing ON and OFF states, that is, a logical signal having high and low levels. The polarity of the signal applied to the signal line $S_1$ is inverted with respect to the polarity of the signal of the signal line $S_2$ by the action of the inverter element INV. Thus, due to the actions of the AND elements $AND_1$ and $AND_2$, the ON signal is not outputted simultaneously to both the signal lines $S_{T1}$ and $S_{T2}$. In this manner, both the transistors $Tr_1$, $Tr_2$ are prevented from being turned on simultaneously. This embodiment is configured in a manner that the first transistor $Tr_1$ is turned on when the signal of the signal line $S_{T1}$ is at the high level and turned off when the signal of the signal line $S_{T1}$ is at the low level, whilst the second transistor $Tr_2$ is turned on when the signal of the signal line $S_{T2}$ is at the high level and turned off when the signal of the signal line $S_{T2}$ is at the low level. When the switching signal $C_{MND}$ is made high, since the second transistor $Tr_2$ can be turned on, the power accumulating circuit 4 can accumulate power. In contrast, when the switching signal $C_{MND}$ is made low, since the first transistor $Tr_1$ can be turned on, the accumulated power can be outputted to the outside.

Figure 5A:
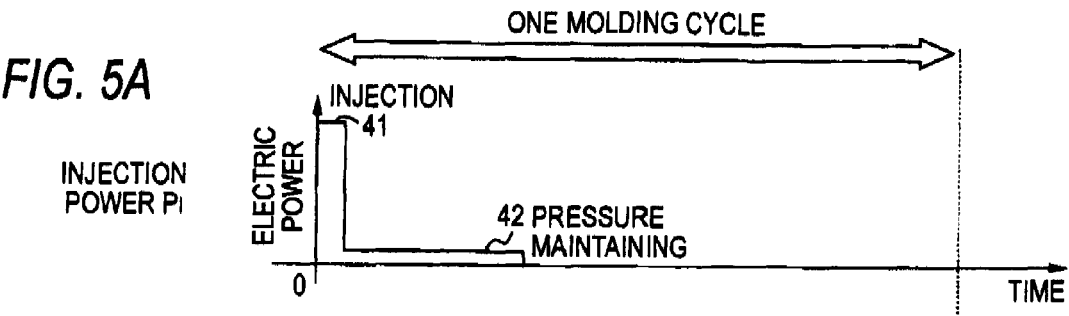
FIGS. 5A to 5F are graphs for explaining a power consumed in each process of the molding cycle of the injection molding machine provided with the power accumulating device according to the embodiment, wherein each of FIGS. 5A to 5D shows a graph representing a power consumed in the respective processes.
Figure 5B:
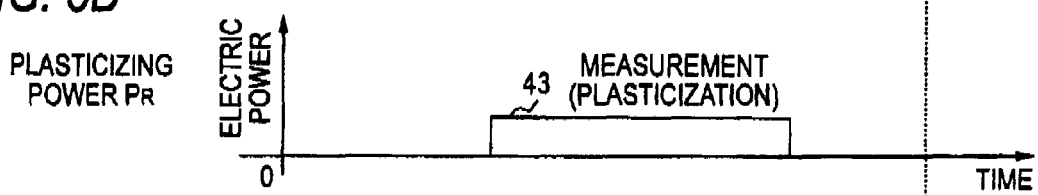
Figure 5C:
Figure 5D:

The explanation will be made as to the power consumption and supply in the respective processes of the molding in the injection molding machine 100 provided with the power supply device 1 according to the embodiment. As is well known in the related art, when the screw of the injection device is driven in the axial direction, the melted resin can be injected into the mold-clamped metal molds. When a predetermined force is applied to the screw succeedingly after the injection, the pressure of the melted resin can be maintained. FIG. 5A is a graph showing the power consumed in an injection process and a pressure maintaining process, that is, the consumption power of an injection power $P_I$. As shown by a numeral 41, although the injection process requires a quite large electric power, an amount of the consumption electric power is not so large since the injection time period is quite short. On the other hand, as shown by a numeral 42, although the time period of the pressure maintaining process is relatively long, an amount of the required electric power is small. A plasticizing process, that is, the measurement of the melted resin is performed by rotating the screw within the injection cylinder of the injection device after completing the pressure maintaining process, as is well known in the related art. FIG. 5B shows an amount of the consumed power of the plasticizing power $P_R$ by a numeral 43. As is shown in this figure, the plasticizing process takes a relatively long time and a predetermined electric power is consumed. When the resin injected within the metal molds is cooled and solidified, the mold clamping device is operated to open the molds. FIG. 5C shows an amount of electric power consumed in the mold clamping device, that is, a mold opening/closing power $P_M$. The electric power consumed in the mold opening process shown by a numeral 44 is a predetermined power and this process does not take a long time. An amount of electric power consumed in a protruding process for protruding a molded product after the mold opening process, that is, a protruding power PE shown in FIG. 5D is small as shown by a numeral 46 and a time required for this process is short. A mold closing process for closing the metal molds requires a predetermined amount of electric power as shown by a numeral 45 and a time required for this process is relatively short.

Figure 5E:
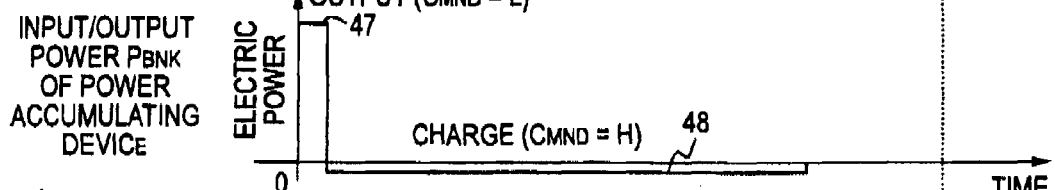
Figure 5F:
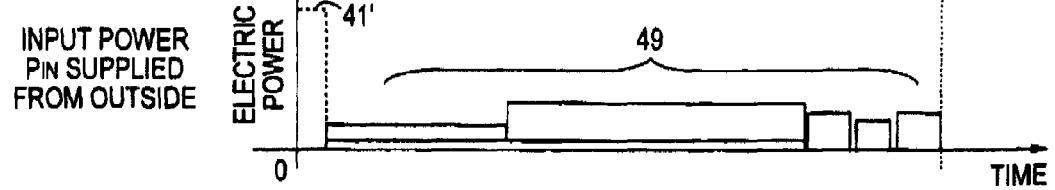

The power accumulating device 3 according to the embodiment supplies a large electric power instantaneously to a servo amplifier in place of the AC/DC converter 2 in the injection process requiring the largest power among the respective processes for the molding. The power accumulating device accumulates an electric power during a process(es) requiring a relatively small amount of electric power. An input/output power $P_{BNK}$ is shown by numerals 47 and 48 in FIG. 5E, wherein numeral 47 represents the power outputted to the outside from the power accumulating device 3, and numeral 48 represents the power supplied from the outside to the power accumulating device 3. In the figure, a positive power represents a power outputted to the outside from the power accumulating device 3 and a negative power represents a power supplied to the device from the outside. A portion shown by a numeral 47 has the same shape as the graph shown by the numeral 41, and a portion shown by a numeral 48 is a small negative power. Since an amount of electric power to be outputted and an amount of electric power to be accumulated is same, an area surrounded by the graph shown by the numeral 47 and the time axis is same as an area surrounded by the graph shown by the numeral 48 and the time axis. An electric power supplied from the external three-phase AC power supply PW, that is, an input power $P_{IN}$ is obtained by subtracting an input/output power $P_{BNK}$ of the power accumulating device 3 from the sum of powers $P_I$, $P_R$, $P_M$, $P_E$ required in the respective processes. FIG. 5F shows a graph of the input power PIN. Although the power necessary for the injection process is cut as shown by a numeral 41', a power required during a time period other than the injection process is not so large as shown by the numeral 49.

In the injection molding machine 100 provided with the power supply device 1 according to the embodiment, an average power PAVE necessary for the molding cycle is given by the following expression:

$$P_{AVE}=(P_{I2} \cdot T_{I2}+P_R \cdot T_R+P_{M1} \cdot T_{M1}+P_{M2} \cdot T_{M2}+P_E \cdot T_E+P_{CH} \cdot T_{CH})/T_{CYC}$$

Where, $T_{CYC}=T_{I1}+T_{I2}+T_R+T_{M1}+T_{M2}+T_E+T_S$, and $T_{CYC}$ represents the molding cycle time, $T_{I1}$ the injection time, $T_{I2}$ the pressure maintaining time, $T_R$ a measuring time, $T_{M1}$ a mold opening time, $T_{M2}$ a mold closing time, $T_E$ a protruding time, $T_S$ a downtime, $T_{CH}$ a charging time (a time period for accumulating a power), $P_{I2}$ a power for pressure maintaining, PR a power for plasticizing (a power for measuring), $P_{M1}$ a power for mold opening, $P_{M2}$ a power for mold closing, $P_E$ a power for protruding, and $P_{CH}$ a power for charging.

In the injection molding machine 100 provided with the power supply device 1 according to the embodiment, the maximum power in the molding process can be reduced and the power consumed in the molding cycle can be smoothed. Thus, in the case of determining the power capacity of the power receiving equipment of a factory, it is sufficient to merely take the average power PAVE into consideration and it is not necessary to take the maximum power into consideration. Thus, the power capacity of the power receiving equipment of a factory can be made small. Although the explanation is made only in a case that the power supply device 1 according to the embodiment supplies power during the injection process, the power supply device can also supply power during other processes requiring a large power.

Figure 6A:
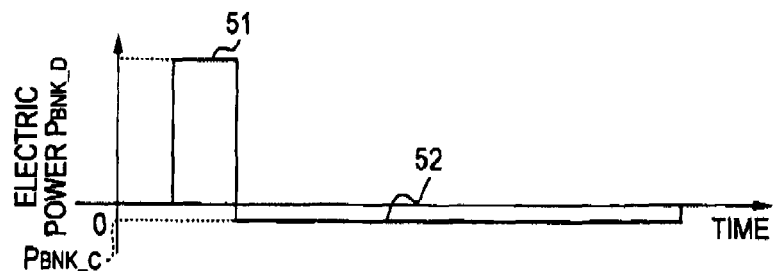
Figure 6B:
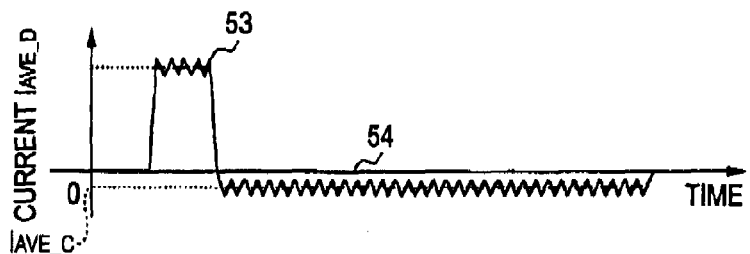
Figure 6C:
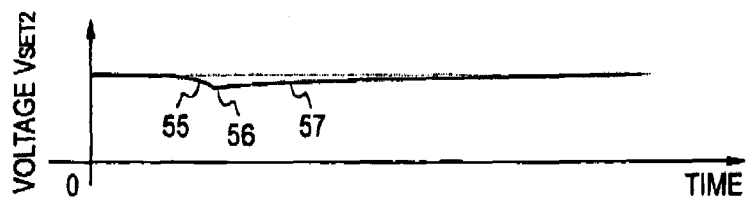

FIGS. 6A to 6D are graphs showing the changes of the input/output power $P_{BNK}$, the coil current $I_{FB}$ flowing into the coil L and the accumulated voltage $V_{FB2}$ of the capacitor C in the case where a power is inputted into and outputted from the power accumulating circuit 4. FIG. 6A shows a graph 51 representing a power $P_{BNK\_D}$ outputted from the power accumulating circuit 4 to the outside and a graph 52 representing a power $P_{BNK\_C}$ supplied from the outside and accumulated. As explained above, in the case of outputting a DC current to the outside from the power accumulating circuit 4, the first transistor $T_{r1}$ is turned on and off. When the ON/OFF operation is designed so as to be performed at a high frequency or the inductance of the coil L is designed so as to be made large, a so-called a current continuous mode is set, whereby the coil current $I_{FB}$ flows continuously as shown by a numeral 53 in FIG. 6B. In the case of accumulating a power in the power accumulating circuit 4, the second transistor $T_{r2}$ is turned on and off. In this case, when the ON/OFF operation of the second transistor is performed at a high frequency, the coil current $I_{FB}$ flows continuously as shown by a numeral 54, like the case of outputting the power. Supposing that an average current of the current shown by the numeral 53 is $I_{AVE\_D}$ and an average current of the current shown by the numeral 54 is $I_{AVE\_C}$, a power $P_{BNK\_D}$ outputted to the outside from the power accumulating circuit 4 and a power $P_{BNK\_C}$ supplied from the outside and accumulated are represented by the following expressions:

$$P_{BNK\_D}=I_{AVE\_D} \cdot V_{PN}(W), P_{BNK\_C}=I_{AVE\_C} \cdot V_{PN}(W)$$

where $V_{PN}$ is a voltage between the positive and negative terminals P and N.

The accumulated voltage $V_{FB2}$ of the capacitor C reduces as shown by a graph represented by a numeral 55 when the power accumulating circuit 4 outputs a power to the outside, whilst increases as shown by a graph represented by a numeral 57 when a power is accumulated in the power accumulating circuit.

Figure 6D:
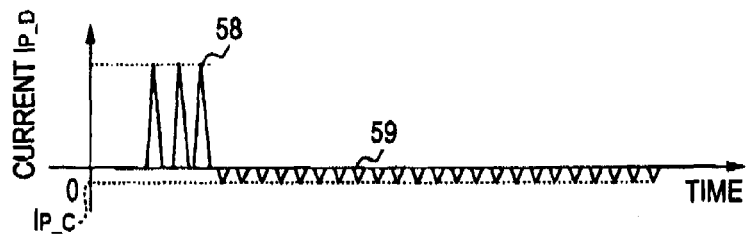

When the ON/OFF operation of the first transistor $T_{r1}$ and the second transistor $T_{r2}$ is designed so as to be performed at a relatively low frequency or the inductance of the coil L is designed so as to be small, a so-called current discontinuous mode is set in which the coil current $I_{FB}$ flows intermittently. FIG. 6D shows graphs represented by numerals 58 and 59 in the case of outputting and accumulating a power in the current discontinuous mode, respectively. Supposing that a peak value of the coil current at the time outputting a power is $I_{P\_D}$ and a peak value of the coil current at the time accumulating a power is $I_{P\_c}$, the power $P_{BNK\_D}$ outputted to the outside from the power accumulating circuit 4 and the power $P_{BNK\_C}$ supplied from the outside and accumulated are represented by the following expressions:

$$P_{BNK\_D}=L_f I_{P\_D}^2 \cdot n/2(W), P_{BNK\_C}=L_f I_{P\_C}^2 \cdot n/2(W)$$

where $L_f$ is the inductance of the coil L and n is the switching number of times per one second.

Figure 7A:
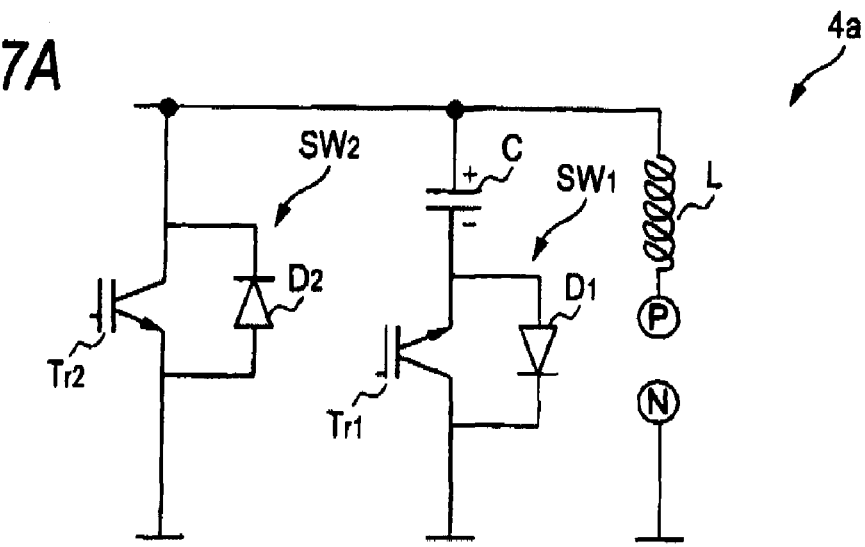
Figure 7B:
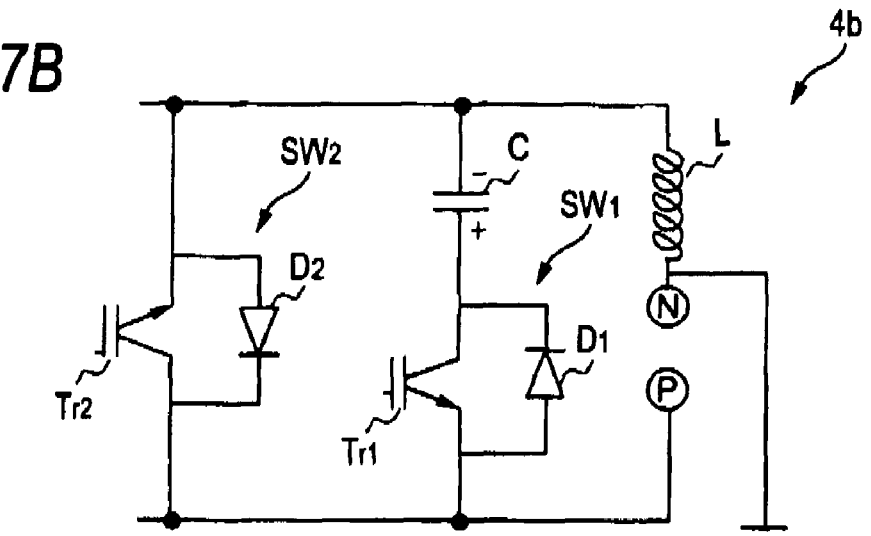
Figure 7C:
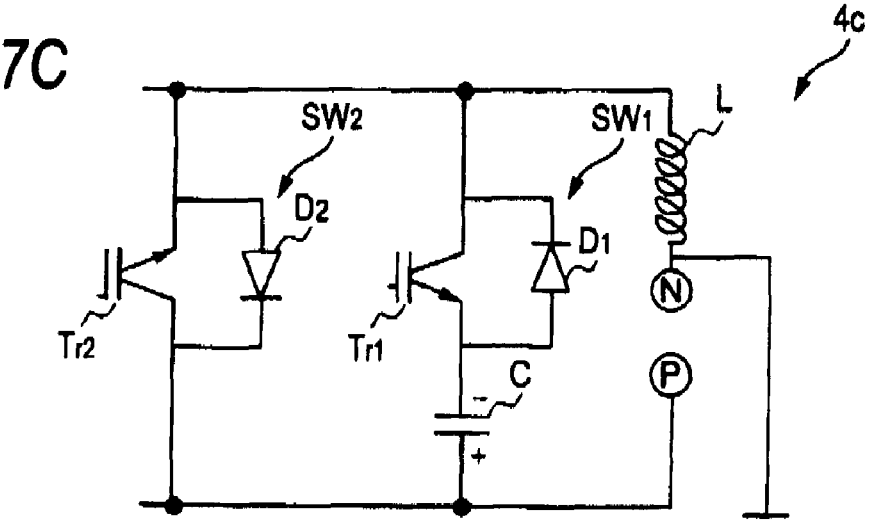

FIGS. 7A to C show power accumulating circuits 4a, 4b, 4c according to second, third and fourth embodiments, respectively. Each of the power accumulating circuits 4a, 4b and 4c according to the second, third and fourth embodiments is modified only in a part of the arrangement of the constituent element, that is, electronic parts of the power accumulating circuit 4 according to the first embodiment, and is common to the first embodiment in the electronic parts. Thus, the electronic parts identical to those of the first embodiment are referred to by the common symbols, with explanation thereof being omitted. The power accumulating circuit 4a according to the second embodiment is configured in a manner that the capacitor C and the first switch circuit $SW_1$ are exchanged in their arrangement in the power accumulating circuit 4 of the first embodiment. The power accumulating circuit 4b according to the third embodiment is configured in a manner that the coil L coupled to the positive terminal P in the power accumulating circuit 4 of the first embodiment is coupled to the terminal N. The power accumulating circuit 4c according to the fourth embodiment is configured in a manner that the positions of the capacitor C and the first switch circuit SW1 in the power accumulating circuit 4b of the third embodiment are exchanged. Although the explanation is omitted since it will be easily understood for those skilled in the art, each of the power accumulating circuits 4a, 4b and 4c according to the second, third and fourth embodiments respectively can perform substantially the same action and effects as those of the power accumulating device 4 according to the first embodiment, and so can accumulate power and supply power to the outside.

Figure 8A:
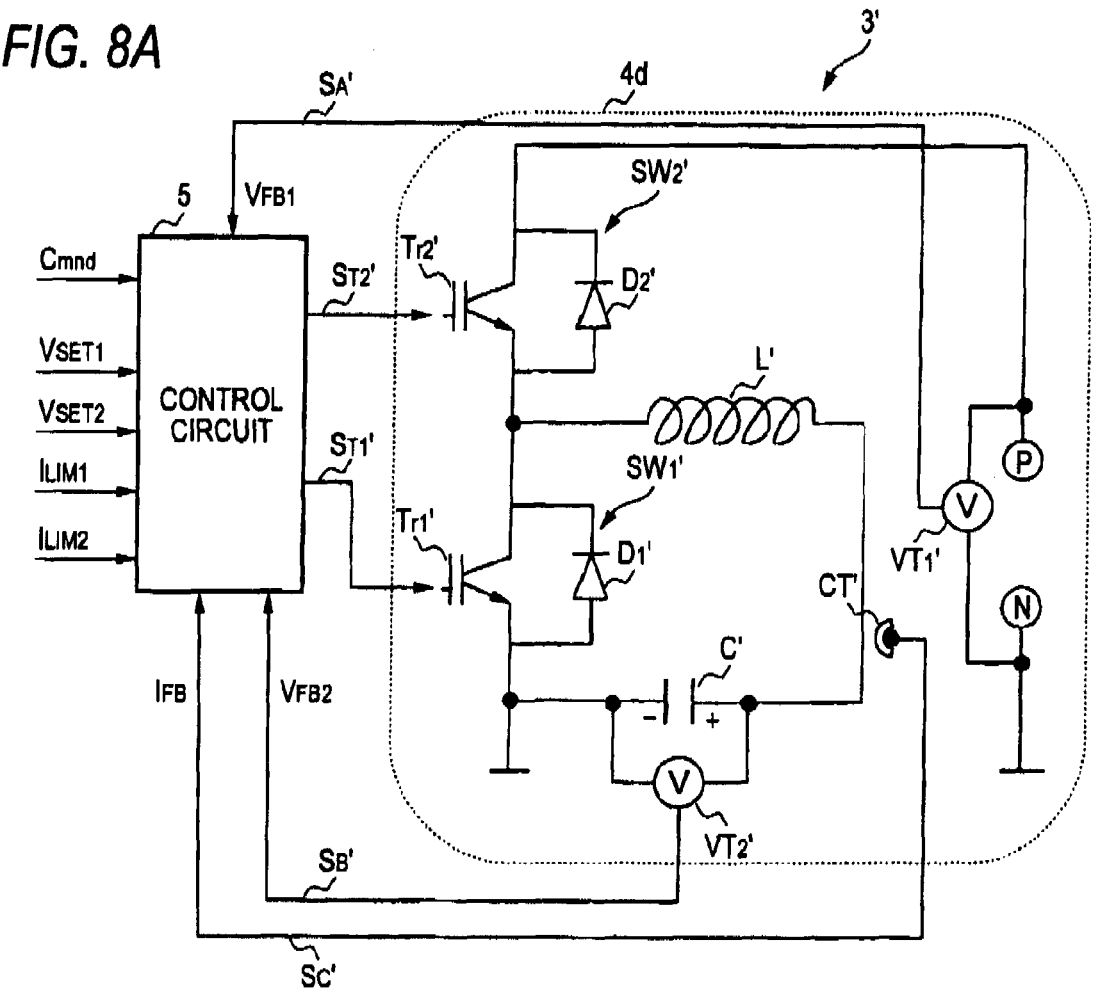
Figure 8B:
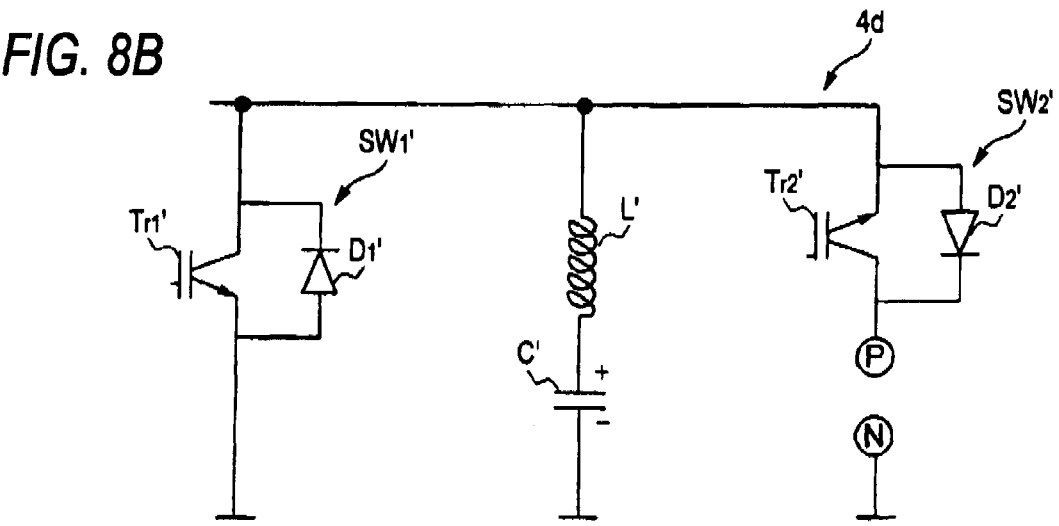

FIG. 8A shows a power accumulating device 3' including a power accumulating circuit 4d according to a fifth embodiment and FIG. 8B shows an equivalent circuit of the power accumulating circuit 4d. In the figure, the constitutional parts, that is, electronic parts which action and effects are identical to those of the power accumulating device 3 according to the first embodiment are referred to by the common symbols added with ', with explanation thereof being omitted. The power accumulating circuit 4d according to the fifth embodiment is same as the power accumulating circuits 4, 4a, 4b and 4c according to the first to fourth embodiments in a point that a power supplied from the outside is accumulated and the accumulated power is converted into a high voltage larger than the DC voltage supplied from the AC/DC converter 2 to thereby supply the high voltage to the outside, but differs in some points. That is, firstly, the voltage of the power accumulated in the capacitor C', that is, the accumulated voltage $V_{FB2}$ does not exceed the terminal voltage $V_{FB1}$. Thus, in the power accumulating circuit 4d, a capacitor C' is not required to have an excessive withstanding voltage efficiency. Further, the power accumulating circuit of this embodiment differs from the power accumulating circuits 4, 4a, 4b and 4c according to the first to fourth embodiments also in the case of supplying the accumulated power to the outside. That is, when a first transistor $T_{r1'}$ is turned on, the power accumulated in the capacitor C' is input to the coil L' and the first transistor $T_{r1'}$, whereby magnetic energy is accumulated in the coil L'. In this case, the power from the capacitor C' is not supplied to any of the positive and negative terminals P, N. When the first transistor $T_{r1'}$ is turned off, a voltage obtained by adding an electromotive force generated at the coil L' to the accumulated voltage $V_{FB2}$ is input between the positive and negative terminals P, N. When the ON/OFF operation of the first transistor Tr1' is repeated, a predetermined power can be supplied between the positive and negative terminals P, N.

The power supply device according to the invention is not limited to the aforesaid embodiments and can be implemented in various manners. For example, although the explanation is made in a manner that each of the power accumulating circuits 4, 4a, 4b, 4c and 4d includes only one capacitor, a plurality of capacitors may be provided in series or in parallel in place of providing one capacitor. Further, it will be clear that the invention can be implemented even if a resistor is provided at an arbitrary position of each of the power accumulating circuits 4, 4a, 4b, 4c and 4d.

The power supply device according to the invention can be applied not only to the injection molding machine but also to other machines such as a production machine and an industrial machine.

What is claimed is:

1. A power supply device for an electrically driven injection molding machine for supplying electric power to a servo motor for driving a member of the electrically driven injection molding machine, the power supply device comprising:
    an AC/DC converter; and
    a power accumulating device, wherein:
    the AC/DC converter is configured to convert an AC voltage into a DC voltage and to supply the DC voltage to a servo amplifier for driving the servo motor; and
    the power accumulating device comprises a power accumulating circuit and a control circuit;
    the power accumulating circuit comprises a first loop circuit and a second loop circuit;
    the first loop circuit comprises a coil, a first switch circuit and a capacitor coupled in series between a positive terminal and a negative terminal;
    the second loop circuit comprises the coil and a second switch circuit coupled in series between the positive terminal and the negative terminal;
    the power accumulating device is configured to accumulate electric power supplied from the DC circuit in the capacitor, and when accepting a predetermined output request, to supply a DC voltage to the DC circuit to thereby supply to the servo amplifier a DC voltage higher than the DC voltage generated from the AC/DC converter.

2. The power supply device for an electrically driven injection molding machine according to claim 1, wherein:
    the first switch circuit comprises a first diode and a first transistor coupled in parallel, the first diode being coupled so as to flow a current in a direction from the positive terminal toward the negative terminal, and the first transistor being coupled so as to flow a current in an opposite direction when being driven by a control signal from the control circuit; and
    the second switch circuit comprises a second diode and a second transistor coupled in parallel, the second diode being coupled so as to flow a current in a direction from the negative terminal toward the positive terminal, and the second transistor being coupled so as to flow a current in an opposite direction when being driven by the control signal from the control circuit.

3. The power supply device for an electrically driven injection molding machine according to claim 2, further comprising:

a current detection circuit for detecting a current flowing into the coil, wherein the control circuit controls an opening/closing operation of the first switch circuit and the second switch circuit so that the current flowing into the coil of the power accumulating circuit is within a predetermined limit value.

4. The power supply device for an electrically driven injection molding machine according to claim 1, further comprising:

a voltage detection circuit for detecting a DC voltage of the AC/DC converter, wherein the control circuit controls an opening/closing operation of the first switch circuit and the second switch circuit so that the DC voltage generated by the power accumulating circuit becomes a predetermined voltage.

5. The power supply device for an electrically driven injection molding machine according to claim 1, further comprising:

a voltage detection circuit for detecting a voltage of the capacitor of the power accumulating device, wherein the control circuit controls an opening/closing operation of the first switch circuit and the second switch circuit so that the voltage of the capacitor becomes a predetermined voltage at a time of accumulating power into the power accumulating device.

6. An electrically driven injection molding machine comprising the power supply device according to claim 1.

7. The electrically driven injection molding machine according to claim 6, further comprising:

a screw;

a mold opening/closing device;

a molded product ejecting device; and a plurality of servo motors configured to drive the screw, the mold opening/closing device, and the molded product ejecting device.

8. A power supply device for an electrically driven injection molding machine for supplying electric power to a servo motor for driving a member of the electrically driven injection molding machine, the power supply device comprising:

an AC/DC converter; and a power accumulating device, wherein:

the AC/DC converter is configured to convert an AC voltage into a DC voltage, which can be supplied to a servo amplifier for driving the servo motor;

the power accumulating device is coupled to a DC circuit of the AC/DC converter;

the power accumulating device comprises a power accumulating circuit and a control circuit;

the power accumulating circuit comprises a positive terminal, a negative terminal, a coil, a capacitor, a first switch, and a second switch, wherein:

the capacitor and the coil are coupled in series;

the circuit comprising the capacitor and the coil is coupled with the first switch in parallel;

the circuit comprising the capacitor, the coil and the first switch is coupled with the second switch in series;

the circuit comprising the capacitor, the coil, the first switch and the second switch is coupled between the positive terminal and the negative terminal;

the power accumulating device is configured to accumulate electric power supplied from the DC circuit in the capacitor, wherein the voltage of the capacitor does not exceed the DC voltage generated from the AC/DC converter, and when accepting a predetermined output request, the power accumulating device is configured to supply a DC voltage to the DC circuit to thereby supply to the servo amplifier a DC voltage higher than the DC voltage generated from the AC/DC converter.

9. An electrically driven injection molding machine comprising the power supply device according to claim 8.

10. The electrically driven injection molding machine according to claim 9, further comprising:

a screw;

a mold opening/closing device;

a molded product ejecting device; and a plurality of servo motors configured to drive the screw, the mold opening/closing device, and the molded product ejecting device.

* * * * *